May 17, 1966   E. H. SHORT III   3,251,615
GROOVED PIPE COUPLING
Original Filed Jan. 31, 1963   3 Sheets-Sheet 3

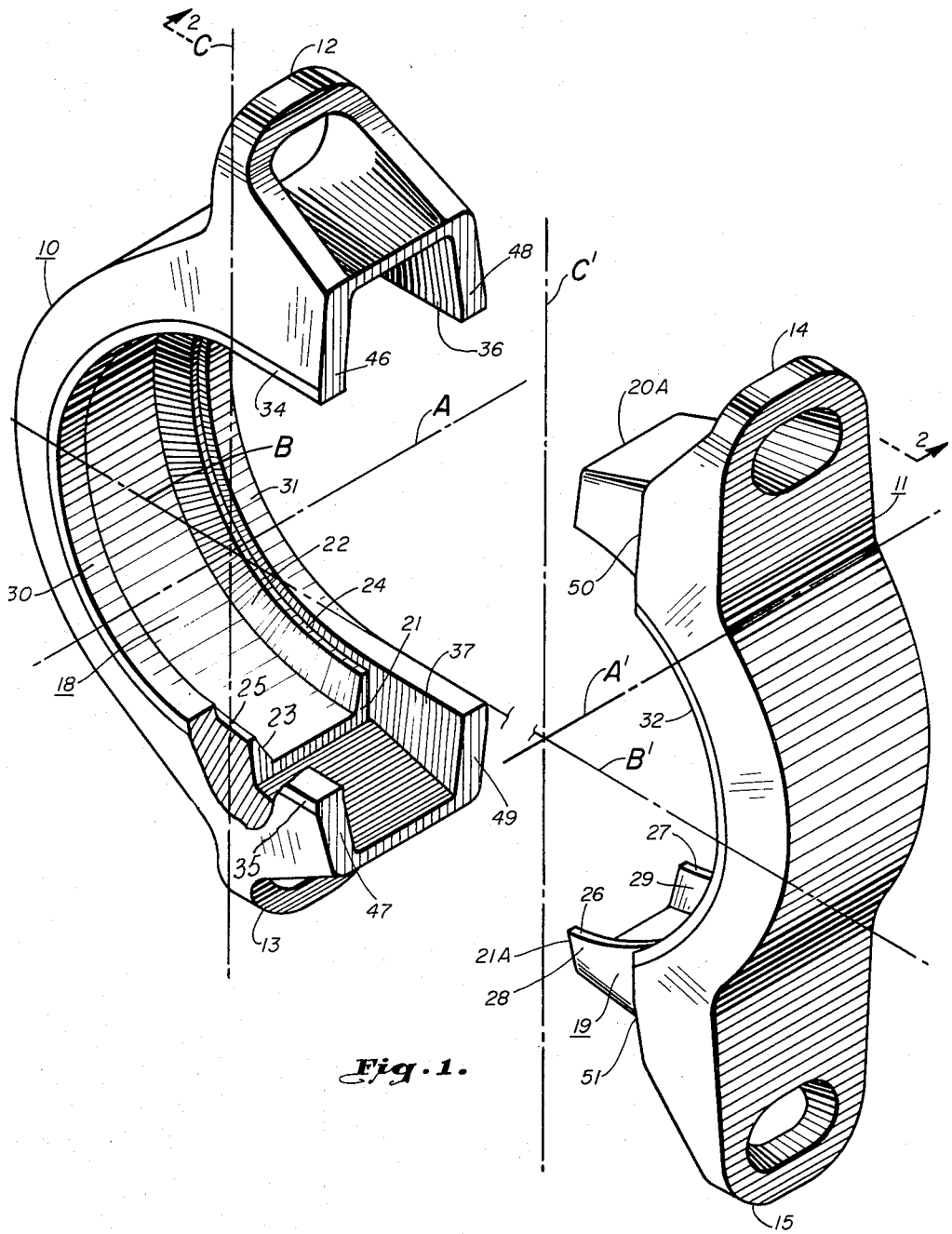

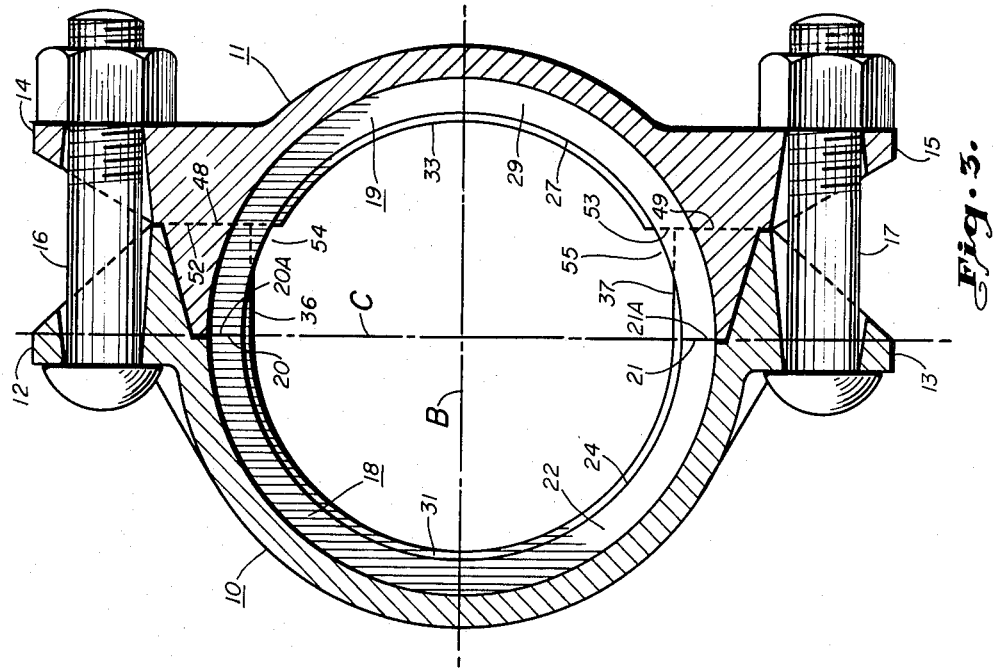
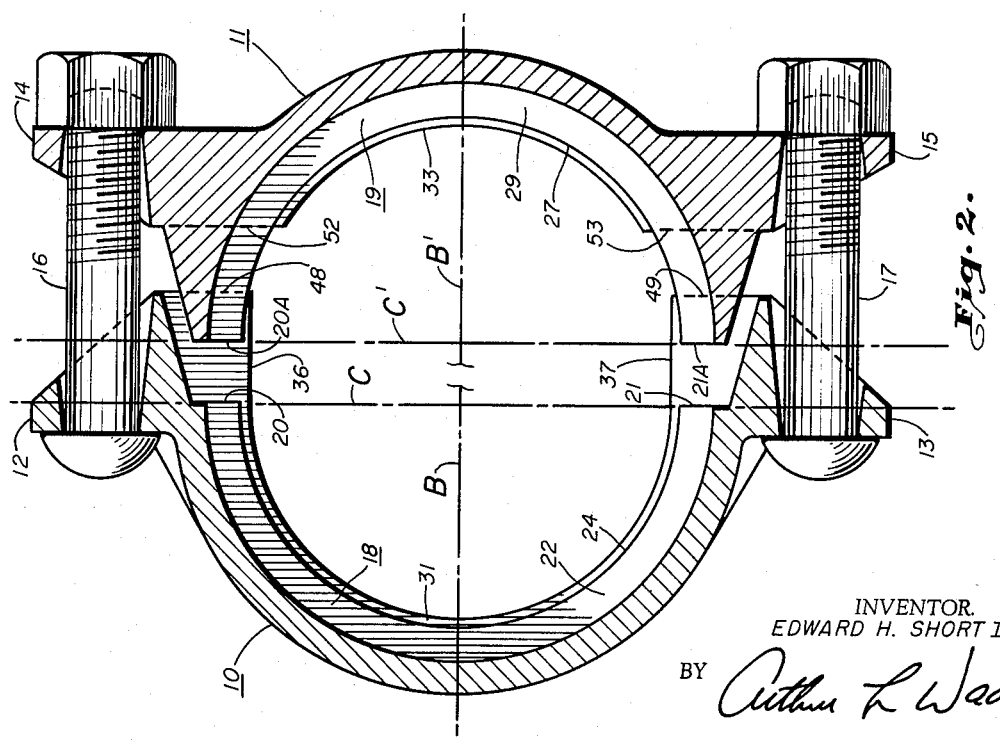
INVENTOR.
EDWARD H. SHORT III
BY
ATTORNEY

INVENTOR.
EDWARD H. SHORT III
BY Arthur L. Wade
ATTORNEY

United States Patent Office 3,251,615
Patented May 17, 1966

3,251,615
GROOVED PIPE COUPLING
Edward H. Short III, Tulsa, Okla., assignor to National Tank Company, Tulsa, Okla., a corporation of Nevada
Continuation of application Ser. No. 255,314, Jan. 31, 1963. This application Feb. 19, 1965, Ser. No. 437,630
2 Claims. (Cl. 285—112)

This application is a continuation of application Serial No. 255,314, filed January 31, 1963, now abandoned.

The present invention relates to two-piece, grooved pipe, couplings. More particularly, the invention relates to the groove-engaging lips of grooved pipe couplings.

It has been conventional to form both portions of a grooved pipe coupling so they are identical to each other. Any two of these halves could be selected at random from stock and fitted together to form the complete coupling. These identical portions have been formed symmetrically on each side of the same diameter of the cross-section of the pipe.

The conventional form for grooved pipe coupling halves has made assembly, and disassembly, difficult. Neither half of the conventional coupling will hold two cylindrical members to be poined in the joined position with any degree of clamping action. The assemblyman must use all his hands, and ingenuity, to bring conventional grooved coupling halves together about pipe ends to be joined. Quite often, an assemblyman, working alone, runs out of hands in his attempt to keep pipe to be joined aligned well enough to bolt conventional couplings in place.

The object of the invention is to provide a grooved coupling half with a form and arrangement which will clamp joined pipe in position, during assembly, with sufficient stability to enable a worker to place the other half of the coupling in assembled position and pass bolts through the halves without need to continuously hold the assembly together by hand.

The invention contemplates groove-engaging lips for half of a coupling which extend their ends past the same centerline of the cross-section of joined pipe for enough to bear against the sides of the groove in a holding, or clamping, action. The forces which tend to act on both, or one, of the pipes to be joined, develop the clamping action between lip and groove which prevents the disassembly of pipe ends and a coupling half. Both hands of a person making the assembly can then be employed to place the second half of the coupling in position and the bolts and nuts through both halves to complete the joining of the pipe.

Other objects, advantages and features of this invention will become apparent to one skilled in the art, upon consideration of the written specification, appended claims, and attached drawings, wherein:

FIG. 1 is an isometric of the two coupling housings embodying the present invention and oriented to be joined together by bolts;

FIG. 2 is a plan view of the housings of FIG. 1 sectioned along lines 2—2 as being drawn together in assembly by bolts;

FIG. 3 is similar to FIG. 2, the bolts having drawn the housings together in assembly.

Figure 4:
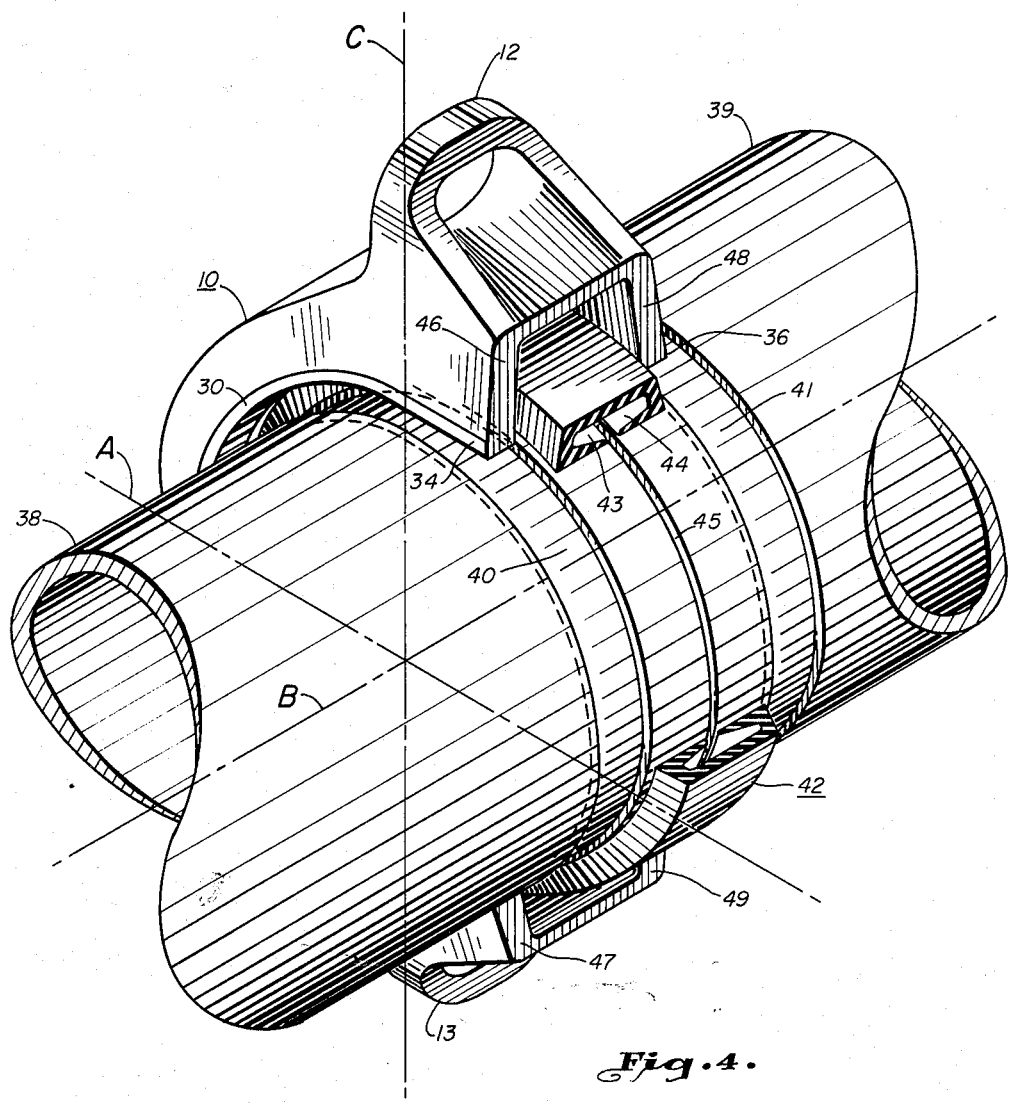
FIG. 4 is a partially sectioned isometric view of the housing portion clamping the ends of coupled pipe.

Referring to FIG. 1, I have shown the two parts of a grooved-pipe coupling housing in which my present invention is embodied. In orienting the two housing parts in FIG. 1, I have assumed the two pipes to be joined by their grooved ends are extended horizontally. However, it is to be understood that vertically extended pipes can be joined as well as members to be joined which are extended at other angles at which misaligning forces are applied.

In FIG. 1 member 10 is the first housing member, oriented to be slipped into position from one side of two pipes to be joined at their grooved ends. Member 11 is oriented to be joined to member 10 from the opposite side of the pipes. Member 10 is provided with lugs 12 and 13. Member 11 is provided with lugs 14 and 15. Holes through lugs 12 and 14 align so a bolt can be slipped through them and draw the housing portions together.

In FIG. 1 the housing portions are separated as before bolts have been slipped through their lug holes. Axis A is placed as both the longitudinal axis of pipes coupled together and the housing when completed. Axis B then becomes a diameter of the cross-section of the coupled pipes. Axis C is also a diameter of the cross-section, but at right angles to axis B. These axes are complemented with respect to housing portion 11 by Axes A', B', and C'. When the two housing portions are joined the axes A, B and C coincide with axes A', B', and C'.

FIGS. 2 and 3 show housing portions 10 and 11 as they are being brought together by bolts 16, 17 (FIG. 2) and brought together (FIG. 3) in final assembly. FIGS. 2 and 3 are sectioned to show how the inner section comes together to actuate the sealing member and the positional relation of the lips, ribs, or keys of the housing portions in final assembly.

Inner section and sealing member

The basic purpose of all grooved-pipe couplings is to hold a gasket of rubber-like material in position to span the ends of pipes joined. The embodiment of the present invention provides the structure to do this positioning of the gasket with that integral part of the housings termed the inner section. Although this section is actually an integral part of the housing portions 10 and 11, it can be seen at 18 in portion 10 and at 19 in portion 11. As a cavity, this section 18, 19 is given the external shape of the gasket it contains. Section half 18 has end faces 20 and 21 which are brought to faces 20A and 21A at axis C to form a uniform cavity for the sealing gasket. This provision for containing the gasket is common with conventional grooved-pipe couplings.

Gaskets used in these couplings may take various forms. The internal shape of the cavity provided by the inner section 18, 19 may take various forms. However, the present invention additionally provides a structure for the housing of which section 18, 19 is but a part. This novel structure enables the assembly of the gasket within inner section 18, 19 to be made by one assemblyman without the use of special tools.

The halves of inner section 18, 19 are arranged symmetrically on each side of axis C. The remainder of the housing portions 10 and 11 are not arranged evenly on each side of axis C. The advantage of this arrangement develops the utility of the present invention.

One other feature of section 18, 19 should be pointed out at this time. The sides 22, 23 of section portion 18 extend inwardly to edges 24, 25. These arcuate edges 24, 25 and 26, 27 of sides 28, 29 of section 19 extend inwardly far enough to bear upon the external surface of the joined pipe, gripping the pipes and tending to make the joint between the pipes rigid within the coupling.

Lips—Ribs—Keys

The remainder of the coupling housing forms a sort of envelope about the inner sections 18, 19. The inner section lines the housing to contain the gasket and hold the gasket into sealing relation with the pipe ends. Although it has been conventional to arrange the enveloping portions of the housing parts symmetrically on each side of axis C, I have found a tremendous advantage in extending the groove-engaging portions of one of the housing parts past the axis C a finite distance.

The parts of the housings fitting down into the grooves are called lips, ribs or keys. Whatever the term, this structure is characteristic of this type of coupling. FIG. 1 shows these lips at 30, 31 on housing portion 10. On housing portion 11, these lips are indicated at 32, 33. The faces on the lips theoretically, and actually, are often carried to the bottom of their grooves in the ends of the joined pipes. More often, however, they are somewhat short of the hand-made grooves. In all events, the lips extend into their grooves far enough to bear their sides on the walls of the grooves and thereby retain the joined pipes longitudinally in the coupling housing.

Now that the fundamental, and conventional, function of lips—ribs—keys 30, 31 and 32, 33 has been fully disclosed, the particular form given this structure to carry out the present invention will be developed. Essentially, the particular form is given lips 30, 31 by extending each end of each lip past the centerline at axis C. When this extension is made, a surprising, useful result is obtained without affecting the function of the housing in holding the sealing gasket in position.

Specifically, the lip 30 is extended past axis C to form extensions 34, 35. Lip 31 is extended past axis C to form extensions 36, 37. What is the result of this extension? The answer is that the housing portion 10, by itself, becomes an efficient clamp capable of holding the pipe ends together without being bolted to portion 11.

Extension of lips 30, 31 past axis C, from both ends of the arcuate portions of the lips, places additional lip material in the grooves of the pipes at a place needed to bear against the sides of the grooves as forces tend to longitudinally separate the pipes or as forces are applied in the direction of axis C to misalign the axes of the joined pipes. With lip extensions 34, 35 and 36, 37 in the pipe grooves and spanning axis C with lip material, an effective clamping action is exerted on the two ends of joined pipes.

Granted, the joint joined between two pipe ends with only housing 10 is but partially stable. Still, the housing as a mechanical clip, does give a finite degree of holding action which frees the hands of the assemblyman. The housing 11 can then be placed in position and bolts 16 and 17 passed through the holes of lugs 12, 14 and 13, 15 and threaded into retaining nuts. This assembly is relatively easy for one man to accomplish, while, by contrast, assembly was very difficult with the conventional coupling, if not often impossible to carry out by one man.

FIG. 4 shows housing 10 acting as a clip in holding pipes 38 and 39 in position. Lip extensions 34, 35 and 36, 37 are in grooves 40, 41 and span axis C. Extensions 34, 35 and 36, 37 become a clamp in the grooves 40, 41. The groove sides bear against the lip extensions of the housing 10. Either way it is stated, the result is a clamping action on the ends of pipes 38 and 39 by this novel form for one of the two portions of a coupling housing.

FIG. 4 also illustrates gasket 42 positioned to seal between pipes 38 and 39. Gasket 42 has been sectioned to illustrate how it generally provides lips 43, 44 against the external walls of pipes 38, 39. Fluid pressure within the pipes 38 and 39 will be directed through the gap 45 between the pipes and onto the lips 43, 44. This gasket may take various forms. In FIG. 4 it is shown to illustrate how a gasket cooperates with these grooved couplings in a general way.

FIG. 4 shows the housing 10 positioned about gasket 42 but without the lips 30, 31 fully engaged with grooves 40, 41. The gasket body is bulky enough to preclude the complete engagement. However, the lip extensions 34, 36, 35, 37 are long enough to go past axis C and clamp pipes 38, 39 together. The invention thereby operates to retain pipes 38, 39 together until the assemblyman can get housing 11 in position and bolts 16, 17 drawn up with their nuts. Specifically, the sides of lip extensions 34, 35 and 36, 37 bear against the sides of grooves 40, 41 to retain the pipe ends together. The extensions 34, 35 and 36, 37 span the axis C and bear against the sides of grooves 40, 41 in retention. Any force, or vector of force, parallel to axis B, is therefore successfully prevented from parting pipe 38 and pipe 39.

*Miscellaneous*

FIG. 3 is again used to emphasize that although inner section end faces 20, 20A and 21, 21A come together neatly, the end faces 46, 47 of extensions 34, 35 and the end faces 48, 49 of extensions 36, 37 do not mate as neatly with end faces 50, 51 and end faces 52, 53 of housing 11. Past the centerline of axis C, the inner faces of extensions 34, 35 and 36, 37 must be substantially parallel with axis B to extend past axis C. Leaving the arc of the pipe surface, the match between end faces 46 and 50, 47 and 51, 48 and 52, and 49 and 53 becomes less than complete. FIG. 3 displays this lack of complete matching of the end surfaces of the lips.

This novel arrangement leaves less lip material in the grooves than the old, conventional form of housing. These gaps are shown most clearly at 54 and 55 in FIG. 3. Of course, lip 32 could be extended at each end to extend into gaps 54, 55, but this is not necessary. The novel feature of the invention does not reduce the material in the groove a significant amount while the gain of the clamping action is of tremendous importance to this art.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A pipe coupling assembly including;
   pipe sections, each section having a circumferential groove extending below the external surface of the section;
   a gasket mounted to span between the external surfaces of the pipe ends which surfaces are between the grooves and their pipe ends;
   and a housing of two halves fitting over the gasket to seal the gasket to the surfaces of the pipe ends including;
   a first half of the housing of a different configuration than the second half and having lips extending into the grooves for half the circumference and substantial distances past a single diameter of the cross-section of the pipe sections;
   whereby the said first half of the housing will firmly clamp the pipe sections in assembled position before placing the second half on said pipe sections;
   the second half of the housing having lips extending into the remaining portion of the grooves;
   and means for attaching the two halves of the housing together over the gasket and bring the radial end faces of the lips of the first housing half toward engagement with the radial end faces of the second half.

2. The assembly of claim 1 in which there is included a seat on one side of each lip on each housing half so as to bear on the external surface of the pipe sections adjacent the grooves to make the sections rigid in the assembly.

(References on following page)

References Cited by the Examiner

UNITED STATES PATENTS

| | | | |
|---|---|---|---|
| 804,992 | 11/1905 | Anderson | 285—305 X |
| 1,908,821 | 5/1933 | Cornell | 285—197 |
| 2,362,454 | 11/1944 | Damsel | 285—112 |
| 2,377,510 | 6/1945 | Newell | 285—112 |
| 2,486,120 | 10/1949 | Colton et al. | 285—372 X |
| 2,759,744 | 8/1956 | Risley | 285—112 |
| 2,781,207 | 2/1957 | Detweiler et al. | 285—233 |
| 2,911,239 | 11/1959 | Marzolf | 285—368 X |

FOREIGN PATENTS

| | | |
|---|---|---|
| 3,682 | 1893 | Great Britain. |
| 585,024 | 1/1947 | Great Britain. |
| 492,630 | 3/1954 | Italy. |

CARL W. TOMLIN, *Primary Examiner.*

THOMAS F. CALLAGHAN, *Examiner.*